United States Patent
Koh et al.

(10) Patent No.: US 11,134,084 B1
(45) Date of Patent: Sep. 28, 2021

(54) DIVERSIFIED AUTHENTICATION AND ACCESS CONTROL

(71) Applicant: HID Global Corporation, Austin, TX (US)

(72) Inventors: Darren Tuadleng Koh, Dublin, CA (US); Arun Suresh Prabhu, Dublin, CA (US)

(73) Assignee: HID Global Corporation, Austin, TX (US)

( * ) Notice: Subject to any disclaimer, the term of this patent is extended or adjusted under 35 U.S.C. 154(b) by 135 days.

(21) Appl. No.: 16/200,931

(22) Filed: Nov. 27, 2018

Related U.S. Application Data

(60) Provisional application No. 62/721,443, filed on Aug. 22, 2018.

(51) Int. Cl.
*H04L 29/06* (2006.01)

(52) U.S. Cl.
CPC ........ *H04L 63/102* (2013.01); *H04L 63/0861* (2013.01)

(58) Field of Classification Search
CPC .......................... H04L 63/102; H04L 63/0861
See application file for complete search history.

(56) References Cited

U.S. PATENT DOCUMENTS

| | | | |
|---|---|---|---|
| 5,205,233 A | 4/1993 | Ingram | |
| 7,086,085 B1 * | 8/2006 | Brown | G06F 21/31 714/E11.207 |
| 8,584,219 B1 * | 11/2013 | Toole | H04L 63/105 726/7 |
| 9,801,066 B1 * | 10/2017 | Hanley | G06Q 20/1085 |
| 9,942,761 B1 * | 4/2018 | Cheng | H04L 63/0861 |
| 9,971,894 B2 | 5/2018 | Shear et al. | |
| 10,972,458 B1 * | 4/2021 | Gaeta | H04L 63/0876 |
| 10,979,430 B1 * | 4/2021 | Hitchcock | H04L 63/0861 |
| 2002/0013898 A1 * | 1/2002 | Sudia | G06Q 20/02 713/155 |
| 2008/0189776 A1 * | 8/2008 | Constable | G06F 21/32 726/7 |
| 2010/0100945 A1 * | 4/2010 | Ozzie | H04L 9/321 726/5 |
| 2011/0035788 A1 * | 2/2011 | White | H04L 9/3231 726/4 |
| 2012/0084563 A1 | 4/2012 | Singhal | |

(Continued)

OTHER PUBLICATIONS

R. Sun et al., Multi-agent reinforcement learning; weighting and partitioning, Neural Networks, vol. 12, Issues 4-5,pp. 727-753, Jun. 1999.

(Continued)

*Primary Examiner* — Aravind K Moorthy
(74) *Attorney, Agent, or Firm* — Schwegman Lundberg & Woessner, P.A.

(57) ABSTRACT

The invention provides for an improved and diversified system, apparatus and method for authenticating and/or authorizing an identity of an action requester within a secure environment. The invention provides for human and non-human agents as authentication factors that can be communicated with in real time via a communications network, such as via the Internet. The invention also provides for facilitating authorization of action requests that are received from non-human action requesters.

15 Claims, 12 Drawing Sheets

(56) References Cited

U.S. PATENT DOCUMENTS

| | | | |
|---|---|---|---|
| 2012/0180124 A1* | 7/2012 | Dallas | G06F 21/46 726/22 |
| 2013/0036462 A1* | 2/2013 | Krishnamurthi | G06F 21/31 726/19 |
| 2013/0232542 A1* | 9/2013 | Cheng | H04L 63/20 726/1 |
| 2013/0312061 A1* | 11/2013 | Casals Andreu | G06F 21/31 726/3 |
| 2015/0242605 A1* | 8/2015 | Du | G06F 21/32 726/7 |
| 2015/0304322 A1* | 10/2015 | Zaidi | H04W 12/06 382/115 |
| 2015/0356351 A1* | 12/2015 | Saylor | G01S 17/894 348/164 |
| 2015/0382195 A1 | 12/2015 | Grim | |
| 2016/0057146 A1 | 2/2016 | Little et al. | |
| 2016/0063235 A1* | 3/2016 | Tussy | G06Q 20/3276 726/6 |
| 2016/0063503 A1* | 3/2016 | Kobres | H04L 63/102 705/18 |
| 2016/0180068 A1 | 6/2016 | Das et al. | |
| 2016/0205094 A1* | 7/2016 | Harthattu | H04W 12/06 455/411 |
| 2016/0366135 A1* | 12/2016 | Furuichi | H04L 41/0866 |
| 2017/0078299 A1* | 3/2017 | Castinado | G06Q 20/3678 |
| 2017/0093829 A1* | 3/2017 | Gitlin | H04L 63/0846 |
| 2017/0195307 A1* | 7/2017 | Jones-Mcfadden | H04W 12/06 |
| 2017/0214687 A1* | 7/2017 | Klein | H04W 12/065 |
| 2017/0223017 A1* | 8/2017 | Kohli | H04L 63/18 |
| 2017/0293763 A1 | 10/2017 | Shear et al. | |
| 2017/0372056 A1* | 12/2017 | Narasimhan | G06F 21/36 |
| 2017/0374070 A1 | 12/2017 | Shah et al. | |
| 2018/0034859 A1 | 2/2018 | Aronowitz et al. | |
| 2018/0083965 A1 | 3/2018 | Donovan | |
| 2018/0124047 A1* | 5/2018 | Fisher | G06F 21/31 |
| 2018/0248863 A1* | 8/2018 | Kao | H04L 63/102 |
| 2018/0322352 A1* | 11/2018 | Phillips | G06K 9/00221 |
| 2019/0007523 A1* | 1/2019 | Walker | H04L 67/28 |
| 2019/0034612 A1* | 1/2019 | Smales | H04W 12/63 |
| 2019/0132303 A1* | 5/2019 | Kurian | H04L 63/08 |

OTHER PUBLICATIONS

X. Vila et al., Security for a Multi-Agent System based on JADE, Computers & Security, vol. 26, Issue 5, pp. 391-400, Aug. 2007.

D. Strom, SecureAuth IdP: An overview of its multifactor authentication ability, (https://searchsecurity.techtarget.com/feature/Multifactor-authentication-products-SecureAuth-IdP-v80, Printed May 30, 2018).

C. Trytten, Security for a Complex Modern IT Environment, Jun. 2018 (https://blog.crossmatch.com/authentication/data-security-modern-environment/, Printed Jun. 13, 2018).

K. Yang, Users Always Getting Prompted for 2 Factor with Device Fingerprinting, Feb. 2018 (https://support.secureauth.com/hc/en-us/articles/220330227-Users-Always-Getting-Prompted-for-2-Factor-with-Device-Fingerprinting, Printed May 30, 2018).

\* cited by examiner

DIVERSIFIED AUTHENTICATION AND ACCESS CONTROL

This document is a United States non-provisional (utility) patent application that claims priority and benefit under 35 U.S.C. 119 (e) to U.S. (utility) provisional patent application having Ser. No. 62/721,443, that was filed on Aug. 22, 2018 and that is entitled "DIVERSIFIED AUTHENTICATION AND ACCESS CONTROL", and which is incorporated herein by reference in its entirely.

PATENT APPLICATION(S) INCLUDING RELATED SUBJECT MATTER

This document is a United States non-provisional patent application that includes subject matter generally related to that of U.S. Pat. No. 6,930,792 to Cannon et al., that was issued on Aug. 16, 2005 and entitled "Web-Enabled Live Scanner and Method for Control".

This also includes subject matter generally related to that of U.S. patent application Ser. No. 15/149,222, that was filed on May 9, 2016, and that was published as U.S. Patent Publication No. 2016/0358010 on Dec. 8, 2016, and that was issued as U.S. Pat. No. 9,734,385 to Yang et al., on Aug. 15, 2017, and that is entitled "Transformed Representation for Fingerprint Data with High Recognition Accuracy.

This also includes subject matter generally related to that of U.S. patent application Ser. No. 15/062,352 to Yang et al., that was filed on Mar. 7, 2016, and that was published as U.S. Patent Publication No. 2016/0269178 on Sep. 15, 2016, and that is entitled "Privacy-Enhanced Biometrics-Secret Binding Scheme".

The above referenced documents are incorporated herein by reference in their entirety as permitted by law.

FIELD OF THE INVENTION

The invention provides for an improved and diversified system, apparatus and method for authenticating and/or authorizing an identity of an action requester within a secure environment. The invention provides for human and non-human agents as authentication factors that can be processed with in real time via a network, such as via the Internet. The invention also provides for facilitating authorization of action requests that are received from non-human action requesters.

BACKGROUND OF THE INVENTION

Security systems are traditionally designed to control access to individuals requesting access, and where such a request for access, being an action request, is typically based upon a claimed identity of the individual requesting access.

The discussion above is merely provided for general background information and is not intended to be used as an aid in determining the scope of the claimed subject matter.

BRIEF DESCRIPTION OF THE INVENTION

The invention provides for an improved system, apparatus and method for authenticating and/or authorizing an identity of an action requester within a secure environment. The invention provides for human and non-human agents as authentication factors that can be communicated with in real time via a network, such as the Internet. The invention also provides for facilitating authentication and/or authorization of an action request that is received from a non-human action requester.

This brief description of the invention is intended only to provide a brief overview of subject matter disclosed herein. This brief description is not intended to identify key features or essential features of the claimed subject matter, nor is it intended to be used as an aid in determining the scope of the claimed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. The drawings are not necessarily to scale, and the emphasis generally being placed upon illustrating the features of certain embodiments of the invention. In the drawings, like numerals are used to indicate like parts throughout the various views. For further understanding of the invention, reference can be made to the following detailed description, read in connection with the drawings in which.

DETAILED DESCRIPTION OF THE INVENTION

Figure 1:
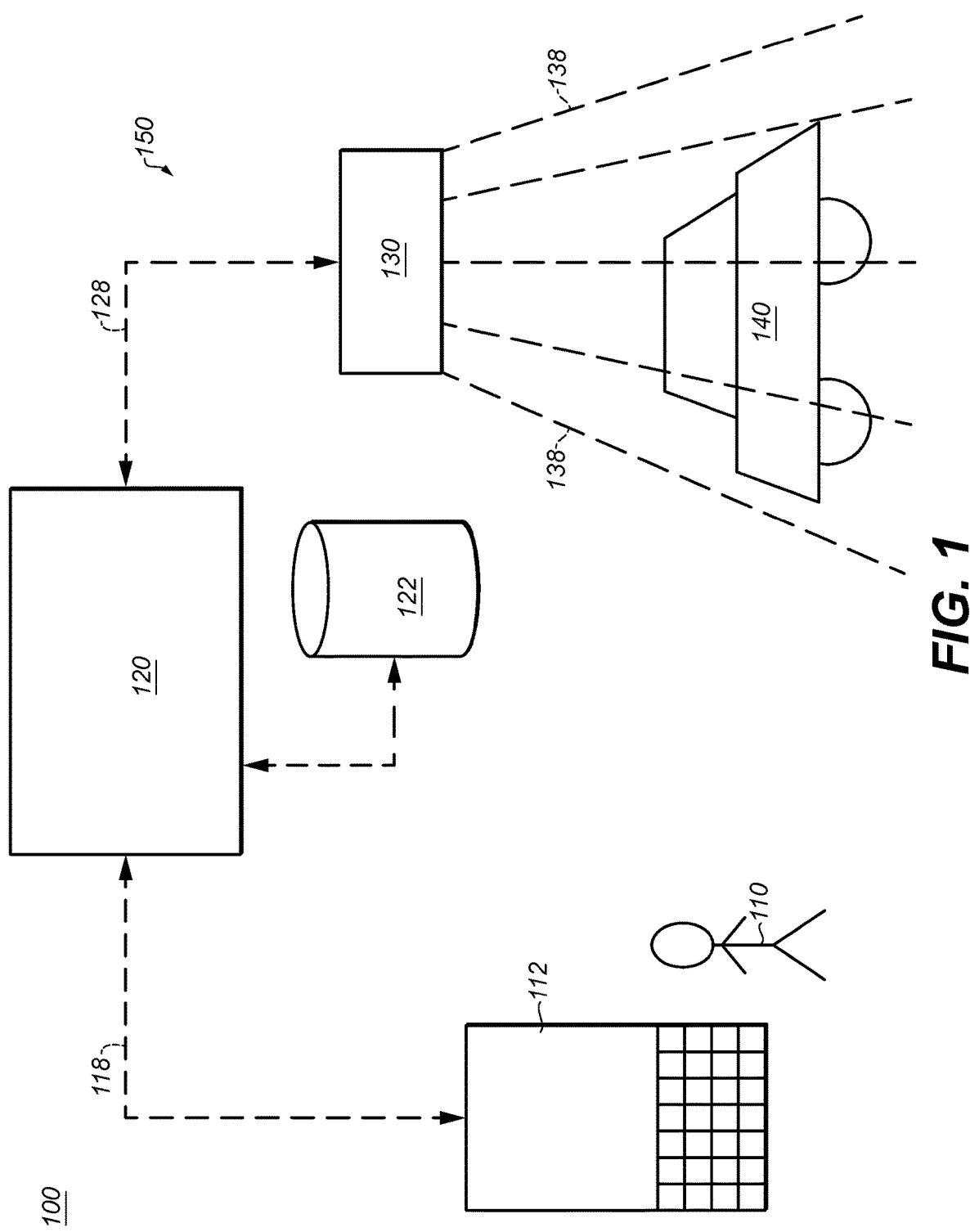
FIG. 1 illustrates a diagram of an individual (action requester) requesting an action to be permitted (authorized) by a security system that employs a global positioning system (GPS) device as an authentication factor.

FIG. 1 illustrates a diagram of an individual action requester, being a human being, requesting an action to be permitted (authorized) by a security system 150 that employs a global positioning system racking device, as an authentication factor.

The action requested is an action of providing to the action requester 110, access to the computer system 120. A system of security 150, also referred to herein as a security system 150, operates over a network including multiple communication channels 118, 128, and interacts with the action requester 110, and interoperates with the computer system 120, and is designed to protect the computer system 120 from being accessed by other individuals that are not authorized to access the computer system 120.

Individuals that are authorized to access the computer system 120, are also referred to herein as authorized individuals. This type of security system 150 is also referred to herein as an access control mechanism or access control system. Such an access control system can be applied to protecting access to other types of resources, such as physical space and non-computer resources. For example, such an access control system can be employed to access a secure space within a facility.

In one use scenario, the action requester 110, interacts with a computer terminal 112, which functions as an action request interface component. In some embodiments, the computer terminal 112 is implemented as a desktop personal computer. In other embodiments, other types of computer and/or communication devices, including more portable devices, including hand held devices, can be employed as an action request interface component, as the computer terminal 112 is employed here. In this embodiment, the computer terminal 112 includes a user interface screen and a text input keyboard. The computer terminal 112 is also referred herein as an action request interface component.

In this example scenario, authentication only requires entry of a correct username and password. In other scenarios, biometric measurements of the action requester, and other portable tokens in possession of the action requester, and knowledge of the action requester, and prompted actions of the action requester, are employed as evidence to satisfy a set of authentication factors, which collectively supply evidence of authentication of the action requester, and which this set of authentication factors is collectively also referred to herein as authentication information. Note that authentication is a process of identifying an individual (action requester), and such authentication verifies that the individual (action requester) is who they claim to be.

In this use scenario, the action requester 110 is an individual is named "Alice Irene Smith", and she inputs via the text input keyboard, a username as a string of text characters, being a text string of "aismith", and enters a password as a text string of "letmein". Implicitly, the action that is being requested is for the security system 150 to provide access to the computer system 120 via the computer terminal 112.

The username is processed by the security system as a claim of identification of the individual, being Alice Irene Smith, who is also referred to herein as AIS, and who is acting as the action requester 110. The password is processed by the security system as evidence of authentication of the identification of the action requester 110, as claimed by the action requester 110. The username and password are referred to herein as traditional types of authentication factors. The username is also referred to herein as an identifying factor. The security system 150 accesses a database that stores both the username and the password and stores a unique association between the username and the password.

The security system determines whether the username exactly matches a user name that is stored into a database of the security system, and that the user name is associated with that of an individual that is authorized to access the computer system, and further determines whether the password being communicated by the action requester 110, exactly matches a password that is stored (registered) within the security system 150, and determines that the password is associated with the same username communicated by the action requester 110.

If there is an exact matching for the determinations described above, then the security system 150 provides authentication (verification) of a correctness of the combination of the username ("aismith") and the password ("letmein") and verifies a correctness of the association there between, and accordingly provides permission (authorization) for access to the computer system 120 to the action requester 110, via the computer terminal 112.

The above described authorized (permitted) access to the computer system 120 is provided to the action requester 110, whether or not the action requester is in fact, the same Alice Irene Smith who is registered inside of the security system 150, as being a person who is authorized to access the computer system 120.

If the action requester is not the same Alice Irene Smith who is registered inside of the security system, then the action requester is referred to herein as an imposter or as an attacker upon the security system 150 and/or the computer system 120. This imposter (attacker) is said to be masquerading as the same Alice Irene Smith (AIS) who is registered inside of the security system 150 as who is a person who is authorized to access the computer system 120.

The username is herein classified as an identifying factor, which is processed by authentication logic within the security system 150. The password is herein classified as an authentication factor. An authentication factor is employed to increase a likelihood that the identifying factor is authentic, meaning that the action requester presenting (entering, inputting, communicating) the identifying factor, is in fact, the same person that originally registered the user name (identifying factor) and the password (authenticating factor) with the security system 150, and who is presumably a person authorized to access the computer system 120. Note that the username can also be considered to be an authentication factor, especially in circumstances where the username is held as a secret by the action requester, like a password is expected to be held in secret by the action requester.

In accordance with the invention, incorporation of additional and/or other types of non-traditional authentication factors are employed to further increase a likelihood that the identifying factor is authentic, and to reduce a likelihood of an imposter performing a successful attack upon the security system 150. These additional and other types of authentication factors can each be generally classified as falling within the scope of a non-human or a human category of factors, and can be combined together into various combinations to form a set of one or more authentication factors.

Traditional authentication factors fall into the general categories of what a person knows, what object the person has in his/her possession and what personal characteristic that person has in in terms of physical (biometric) features/characteristics, such as recognition of a fingerprint, face, voice, palm print etc. Something that a person knows could be a password, for example. Something in possession of a person could be a key or a security token, for example.

Note that despite the value of employing traditional authentication factors, reliance upon such traditional authentication factors can fail in various ways. Secrecy of a username and an associated password can be violated, biometric matching can sometimes fail via a false positive or a false negative matching result, a security token can be lost or stolen. A false positive biometric matching result permits inappropriate access. A false negative biometric matching result denies appropriate access.

In accordance with the invention, use of non-traditional authentication factors can further reduce a likelihood of authorizing inappropriate access via a security system. For example, in one embodiment, an authentication factor can employ a GPS (global positioning system) tracking device.

The GPS tracking device is designed to be remotely (wirelessly) queried in real time by a GPS communication device. In some embodiments, the GPS communication device is network accessible, and preferably Internet accessible. In effect, the GPS tracking device operates as an authentication and/or authorizing agent.

Referring to FIG. 1, the action requester Alice Irene Smith (AIS), is shown to be operating a computer terminal 112. The computer terminal 112 functions as an action request interface component. The computer terminal 112 communicates with a computer system 120 via a (first) communication channel 118. The computer system 120 includes a data base 122 within which authentication registration information is stored. The security system 150 communicates via a communication channel 128 to a GPS communications device 130, via the computer system 120.

As shown in this embodiment, the security system 150 resides at multiple locations within a communications network including the communications channels 118 and 128, including within the computer system 120. In some embodiments, the communications channel 118 and/or 128 is a private or public communications network, or some combination thereof. Note that the computer terminal 112, the computer system 120, the GPS communications device 130 and the communications channels 118, 128 and each function within the security system 150.

The GPS communications device 130 communicates via a communications channel 138 to a GPS tracking device 140. The communications channel 138 employs long distance wireless communication between the GPS communications device 130 and the GPS tracking device 140.

In one use scenario, the action requester (AIS) stores a GPS tracking device 140 on his/her person, or carries the device in a briefcase or in an automobile in the possession of the action requester. Upon correct communication of traditional authentication factors, such as communication of a user name and password combination by the action requester into the security system 150, the security system 150 communicates (transmits) a GPS location query request transaction to a GPS communications device 130 via communications channel 118. In response, the GPS communications device 130 wirelessly transmits a location query transaction to the GPS tracking device 140.

In response, the GPS tracking device 140 communicates a current location of the GPS tracking device to the GPS communications device 130, via communications channel 138. In response, the GPS communications device 130 communicates the current location to the security system 120 via communications channel 128. In some embodiments, the current location is encoded within a current location transaction that includes the current GPS co-ordinates of the GPS tracking device 140.

In accordance with the invention, the location of the GPS tracking device can be employed by the security system 150 in a variety of different ways. This type of authentication factor, being that it incorporates GPS location tracking information, is referred to herein as a non-traditional authentication factor.

In some embodiments and security scenarios of the invention, the current location of the GPS tracking device 140 is required to reside within at least one predetermined distance from a target location, to satisfy the authentication requirements for this factor. This target location could be the location of the computer terminal 112 from which the action requester 110 is requesting access to the computer system 120, or at a location of where the action requester 110 is known or expected to be located at the time of occurrence of the request for access to the computer system 120.

In some embodiments and security scenarios, the GPS tracking location is expected to be stationary, meaning that it is not expected to be moving over time at the time of occurrence of the request for access to the computer system 120. The inference being that if the GPS tracking location is moving, then the GPS tracker device 140 cannot be in possession of the action requester 110 while requesting access to the computer system 120 from a stationary computer terminal 112, providing that the computer terminal is known to be stationary.

In other embodiments and security scenarios, the GPS tracking location is expected to be within a distance radius of a target location. In other words, a policy for access security may require the action requester to be located within a distance of a target location.

In other embodiments and security scenarios, the target location is a location of a facility for which the action requester 110 is requesting access. For example, the facility can be a working location of the action requester. This type of authentication factor can be particularly useful when the action requester is attempting to obtain access to a physical space, such as to a particular facility. In some circumstances, there may be restrictions with respect to a location from where the action requester can request access to the computer system 120.

Optionally, in some embodiments and security scenarios, satisfaction of this GPS location authentication factor, whether it be for authentication or authorization, is necessary, meaning that if the current location of the GPS tracking device falls outside of a maximum distance from a target location, then this factor is not satisfied and authentication of the action requester necessarily fails, because satisfaction of this factor is necessary in this security circumstance, and consequently, access to the computer system 120 is not authorized (denied) to the action requester 110.

Or alternatively, in other security scenarios, satisfaction of this authentication factor is not necessary for either authentication or authorization, and where satisfaction of one or more other authentication factors can function as an alternative criteria, to provide sufficient satisfaction of a set of one or more authentication factors, in order for the security system 150 to authorize (permit) performance of the action being requested by the action requester 110.

In other embodiments, satisfaction of this authentication factor can be weighted as a contribution to an overall (final) authentication score, which may also be referred to as an authorization score, in circumstances where sufficient authentication, by itself, constitutes sufficient authorization. In other words, in some circumstances, if the identity of the action requester is sufficiently proven, then the action requester is implicitly authorized. The overall authentication score is determined via exercise of a validation graph that logically and/or mathematically combines one or more authentication values, and where a sufficiently high authentication score exceeding a predefined threshold, constitutes satisfaction of authentication criteria.

Figure 2:
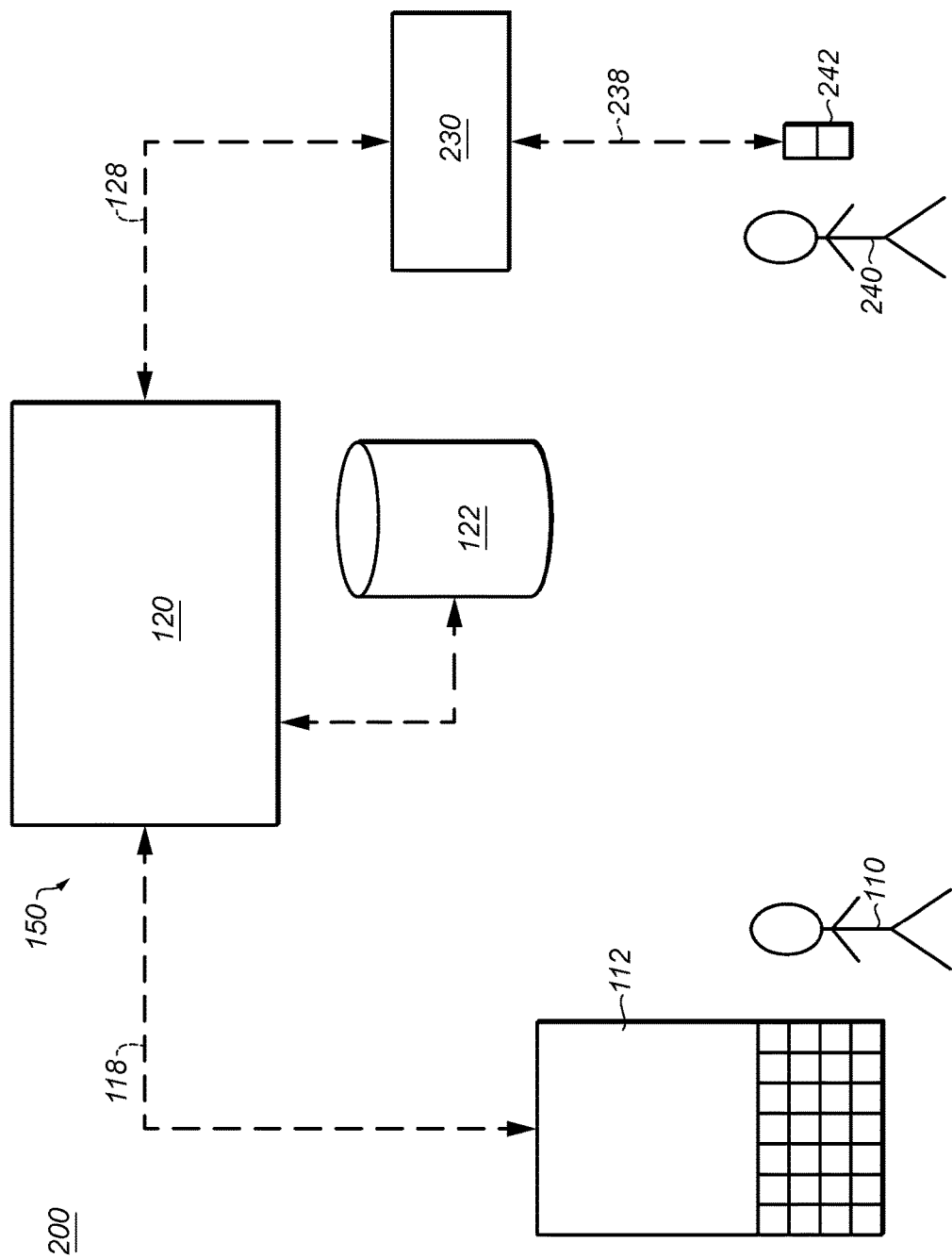
FIG. 2 illustrates a diagram of an individual (action requester) requesting an action to be permitted by a security system that employs a non-traditional and human authentication factor.

FIG. 2 illustrates a diagram of an action requester (person) requesting an action to be permitted by a security system that employs a non-traditional and human authentication factor.

In some embodiments, an authentication factor employs a human being to communicate an approval or disapproval for the purpose of authentication and/or authorization of a request of an action requester. In one embodiment, the security system 150 transmits a communication to a human who is registered as one authentication factor associated with a particular action requester and a particular requested action, as registered within the database 122.

Referring to FIG. 2, being a variation of FIG. 1, Alice Irene Smith (AIS) 110, as the action requester 110, is shown to be operating a computer terminal 112, which functions as an action request interface component. The computer terminal 112 communicates via a communication channel 118 to a computer system 120, which interoperates with a security system 150. The security system 150 communicates via a communication channel 128 to a telecommunications device 230. The telecommunications device 230 communicates via a communications channel 238 to a human agent, acting as an authentication and/or an authorizing factor, who will be referred to herein as David Isaac Jones (DIJ). In some embodiments, the communications channel 118 and/or 128 is a private or public communications network.

In some embodiments, the communications channel 118 and/or 128 is the Internet and the telecommunications device 230 is an Internet accessible device, also referred to as an Internet of Things (IOT) device 230. The communications channel 238 employs long distance wireline and wireless communication though a network of telecommunications equipment, including for example, cell phone towers, telecommunication switches and other related tele-communications equipment.

In one embodiment and security scenario, the human factor (DIJ) 240 is expected to be in proximity and/or possession of a portable communications device 242, such as for example, a mobile telephone 242. In one embodiment, the telecommunications device 230 transmits a first text message to a mobile telephone 242 to inform DIJ 240 that AIS 110, as an action requester, is requesting permission to access the computer system 120, and the text message further instructs DIJ 240 to transmit a second text message back to the telecommunications device 230, the second text message including the word "approve" or including the word "deny" in response to the text message.

Note that preferably, the above described text messages are encrypted upon transmission and decrypted upon reception, by each transmitting and receiving entity respectively, within the security system 150.

For example, communications from the computer system 120 to the telecommunications device 230 and from the telecommunications device 230 to the portable communications device 242, and in the reverse direction, communications from the portable communications device 242 to the telecommunications device 230, and from the telecommunications device 230 to the computer system 120, are subject to encryption and decryption.

During registration of AIS, as an action requester 110, DIJ 240 can be selected to be a supervisor, a co-worker of the action requester AIS 110, or to be some other security related authority to be assigned as an authentication factor. If no response text message is transmitted within a certain predetermined period of time, also referred to herein as a time out period, for example such as a five minute time interval, then this particular authentication factor by default, does not provide approval for the authentication request from the action requester (AIS), and the action requested by the action requester AIS 110, is by default, denied and not approved.

Optionally, the human agent (actor) DIJ 240, acting as an authentication and/or authorizing factor, can request an extension of time to respond to the first text message. In this scenario, in response to receiving the first text message, the human agent can optionally place a telephone call to the action requester (AIS) 110 to verify that (AIS) can be reached by telephone, that her interaction with the human agent DIJ 240, indicates to DIJ that she is in fact AIS 110, and indicates that AIS 110 is in fact, currently requesting access to the computer system 120.

Also, other circumstances may influence a decision of a human agent 240 to approve or deny access for a particular action requester 110. For example, the action requester AIS 110 may be a member of an organization where access to the computer system 120 is rare, and AIS must provide a justification to the human agent 240, regarding why she is requesting access to the computer system 120.

In some circumstances, the human agent DIJ 240 may decide to approve authentication, but separately deny authorization for AIS to access the computer system 120, because of current circumstances that are known to the human agent DIJ 240, and that motivate denial of authorization and at the particular time of the request for access to the computer system 120, from the action requester AIS 110.

In some security scenarios, a validation graph, which is also referred to as an authentication model or authorization model, indicates whether satisfaction of this particular human security factor is necessary for either authentication and/or for authorization, meaning that if this security factor is not satisfied and authentication and/or authorization of the action requester 110 fails, access to the computer system 120 is denied (not approved) to the action requester AIS 110.

Or in other security scenarios, a validation graph indicates that satisfaction of this particular factor is not necessary for either authentication or authorization, and instead, satisfaction of one or more other authentication and/or authorization factors can provide a sufficiently high authentication score, in order for the security system 150 to permit a performance of the action being requested by the action requester.

For example, satisfaction of this factor can be weighted as a contribution to a final (overall) authentication score, where the final (overall) authentication score is determined via exercise of a mathematical weighting formula that mathematically incorporates one or more authentication values to determine an authentication score, and where a sufficiently high authentication score constitutes sufficient authentication criteria.

In some embodiments, as stated earlier, authentication and authorization are combined into one score, referred to herein as an authorization score or as an authorizing score.

Figure 3A:
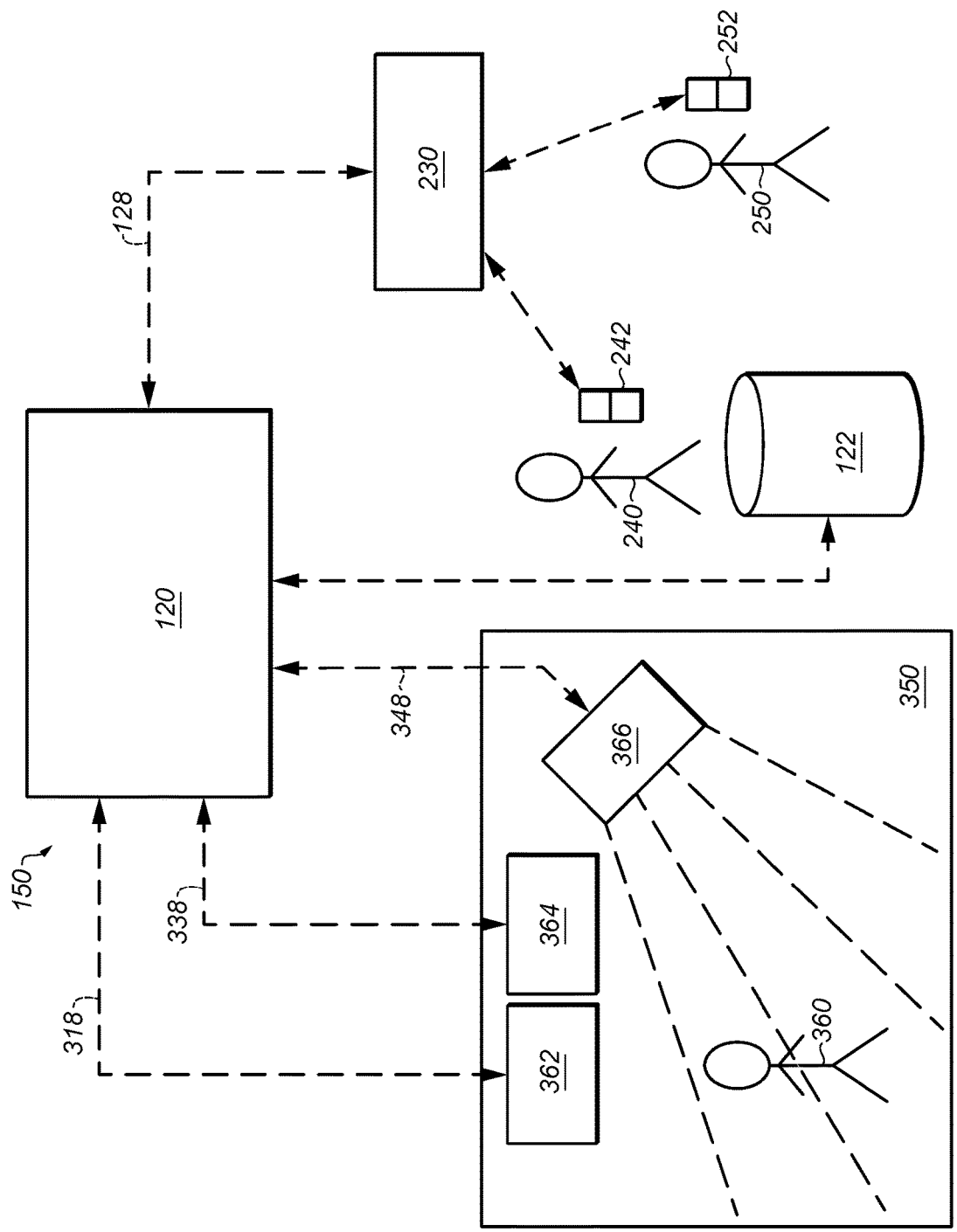
FIG. 3A illustrates a diagram of a non-human action requester requesting an action to be permitted by a security system that employs a variety of types of authentication factors.

FIG. 3A illustrates a diagram of a non-human action requester requesting an action to be permitted by a security system that employing a variety of types of authentication factors.

As shown, a power plant thermal controller (PPTC) 362, that is located within a power plant 350, functions as a non-human action requester. The PPTC 362 is transmitting a request to raise power plant temperature by 2 degrees Fahrenheit. The request is transmitted via a third communication channel 318. Within the power plant, 362 there is also a temperature measurement device 364 and a motion detector 366.

Notice that in this embodiment and security scenario, the PPTC 362 is implicitly authenticated via the employment of encryption and decryption of the communication of the request to raise power plant temperature. In other words, no other authentication factors are employed to authenticate a communication from the PPTC 362 to the computer system 120.

In this embodiment, authorization logic resides inside of the computer system 120 and operates as a portion of the security system 150. The authorization logic processes the request to raise power plant temperature in accordance with the design of the authorization model of FIG. 7. The authorization model of FIG. 7 is based upon a design of the registration model of FIG. 6.

The authorization logic gathers information regarding the current power plant temperature and motion detected within a control room of the power plant 350, and further communicates with the human authorization factors of David Isaac Jones (DIJ) 240 and Charles William Phillips (CWP)250, via communication devices 242 and 252 respectively. Each of these two human authorization factors are further described in association with FIGS. 4A-7B.

Figure 3B:
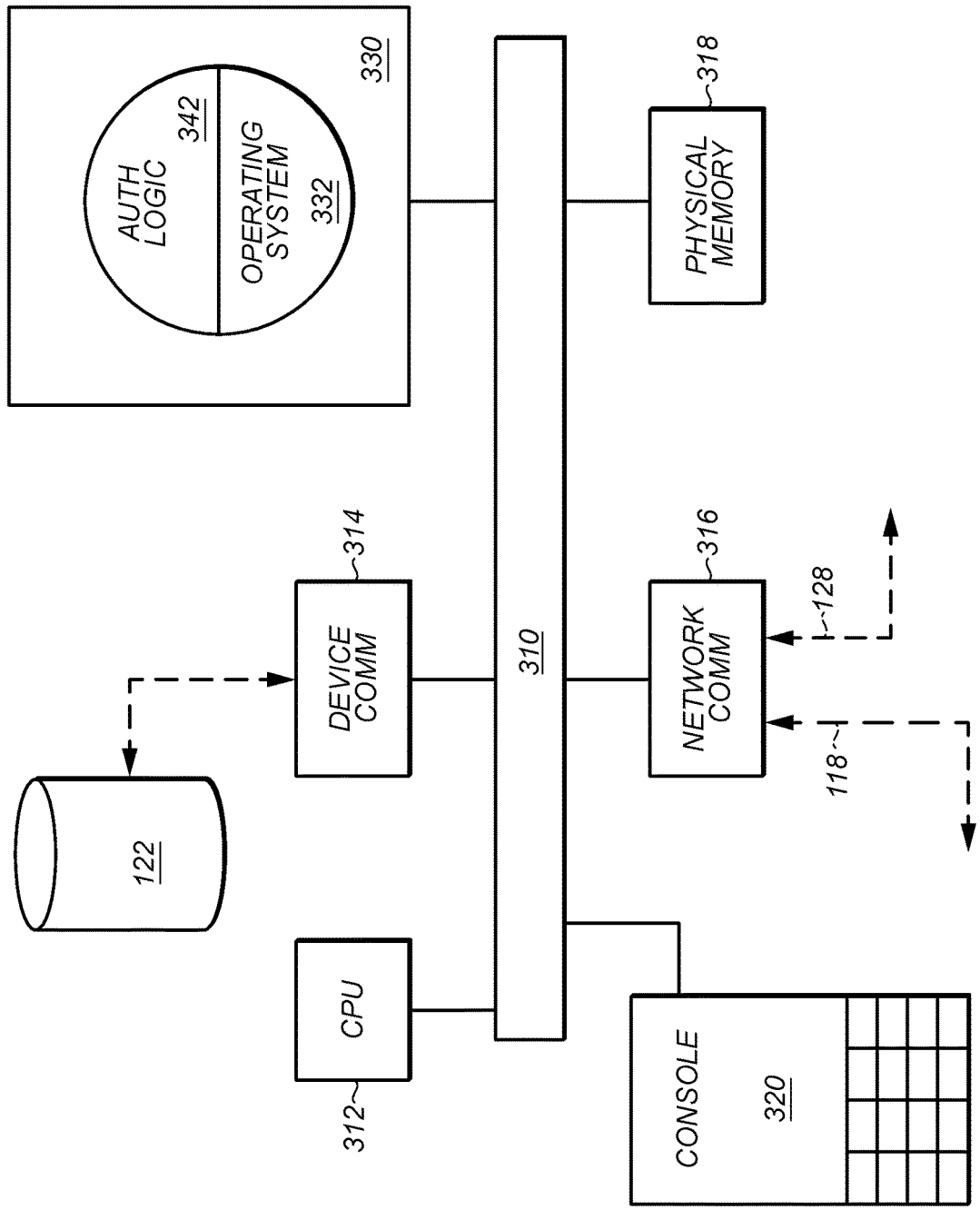
FIG. 3B illustrates a diagram of an embodiment of the computer system that includes hardware and software, and that includes authentication logic which functions as a portion of the security system.

FIG. 3B illustrates a diagram of an embodiment of the computer system 120 that includes hardware and software, and that includes authentication logic which functions as a portion of the security system 150.

As shown for this embodiment, the computer system includes a central processing unit (CPU) 312, device communication hardware 314, network communication hardware 316, physical memory 318 and a console 320, which are electrically connected to a system bus 310. The console 320 provides a user interface to the computer system 120 via a direct (hardwired) electrical interface to the computer system 120.

Within the physical memory 318 resides operating system software 332 and application software. The operating system software 332 assigns physical memory 318 as virtual memory 330. Within the virtual memory 330 there resides application software that includes authorizing logic 342, also referred to herein as an authorizing logic component. The authorizing logic 342 (Auth Logic) is designed to interoperate with the operating system 332 to perform authorizing actions, being actions directed towards authentication and authorization of an action requester as required and in accordance with system security related policy, as described herein. The authorizing logic functions as a component of the security system 150.

Figure 4A:
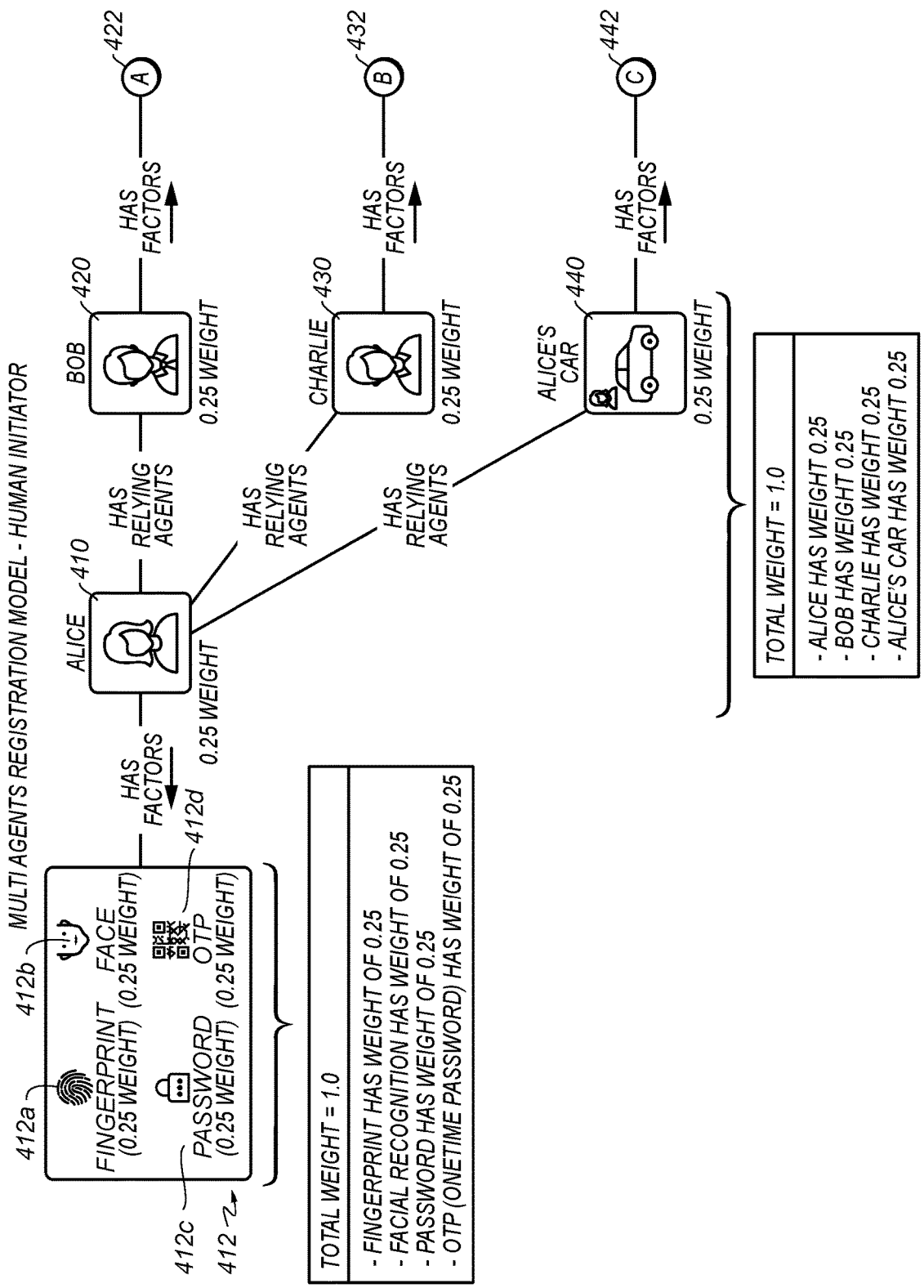
FIGS. 4A-4B illustrates a multiple factor and hierarchical registration model for a human action requester.
Figure 4B:
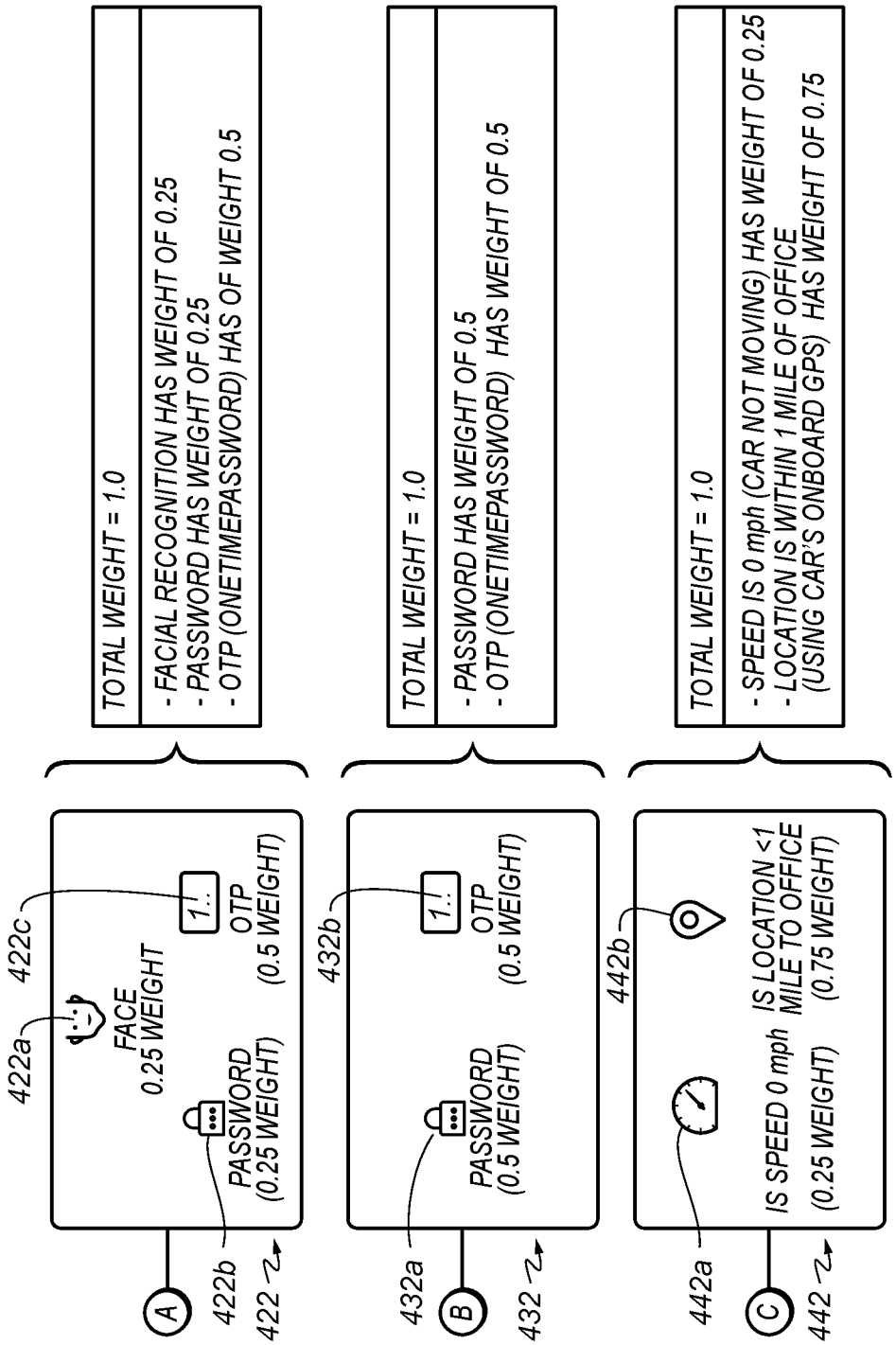

FIGS. 4A-4B illustrate a multiple factor and hierarchical registration model for a human action requester. This model is also referred to herein as an authentication validation graph.

As shown, there are (4) authentication factors (410a-410d) that are directly associated with the action requester, being Alice (Alice) 410. These (4) directly and personally associated authentication factors 412 are fingerprint recognition 412a, face recognition 412b, password 412c and one time password (OTP) 412d factors, which in this example scenario, are each assigned an authentication factor weight equal to (0.25). In other scenarios, a different authentication factor weight can be assigned to each of these authentication factors. These authentication factors include two biometric characteristics 412a-412b of the action requester 410, her knowledge of the password 412c, and the actions of the action requester 410 to satisfy a onetime password (OTP) authentication requirement 412d. These (4) authentication factors are characterized as traditional, and are characterized herein as personal to the action requester 410.

Hypothetically, if the action requester, being Alice (AIS) 410, satisfied all of the (4) personal authentication factors 412, being fingerprint recognition 412a, face recognition 412b, password 412c and OTP 412d factors, she would have an authentication score, based upon the personal authentication factors alone, equal to (0.25+0.25+0.25+0.25=1.0) This score is the maximum possible authentication score for this set of authentication factors 412.

However, there are other types of authentication factors, separate from the authentication factors that are specified above and that are associated with the action requester 410, that can also be employed to authenticate the action requester 410. These other types of authentication factors are associated with, but are not necessarily directly tied to the person of the action requester 440, such for example, the authentication factors 412, for example.

For example, there is a first non-personal authentication factor, being a human agent named Bob 420, otherwise known as Robert Douglas Anderson (RDA) 420, who has (3) associated personal authentication factors 422. These (3) personal factors are face recognition 422a, password 422b and one time password (OTP) 422c, that are each assigned an authentication weight of 0.25, 0.25 and 0.5 respectively. The weights of these associated authentication factors sum to 1.0.

There is a second non-personal authentication factor being a human agent named Charlie 430, otherwise known as Charles William Phillips (CWP) 430, who has (2) associated personal authentication factors. These (2) personal factors are a password 432a and one time password (OTP) 432b, that are each assigned an authentication weight of 0.5 and 0.5 respectively. The weights of these associated authentication factors sum to 1.0.

There is also a third non-personal authentication factor 442 based upon a GPS tracking device that is installed into the automobile (car) that is owned by the action requester AIS 410. This non-personal authentication factor has (2) associated authentication factors, being a measured speed of the car and the second being the location of the car. These (2) GPS associated authentication factors are each assigned an authentication weight of 0.25 and 0.75 respectively. The weights of these associated authentication factors summing to 1.0.

Some authentication factors, such as Bob 420, Charlie 430 function not only as authentication agents, but can further function as authorizing agents. For example, Bob 420 and/or Charlie can be satisfied that the identity of Alice 410 is authentic, but refuse to authorize her to access the computer system other reasons.

Figure 5A:
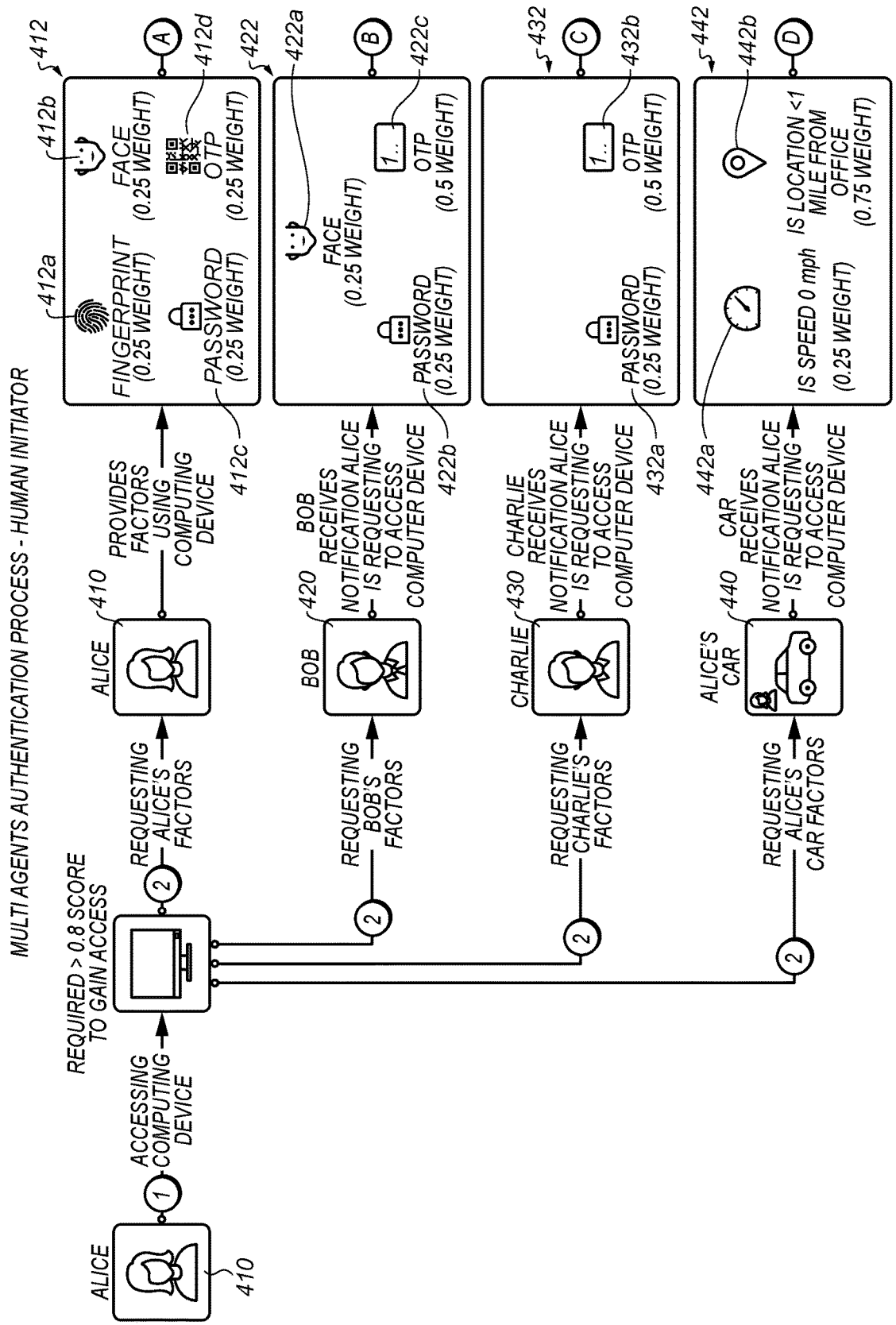
FIGS. 5A-5B illustrates an authentication scenario based upon the multiple factor and hierarchical registration model of FIG. 4.
Figure 5B:
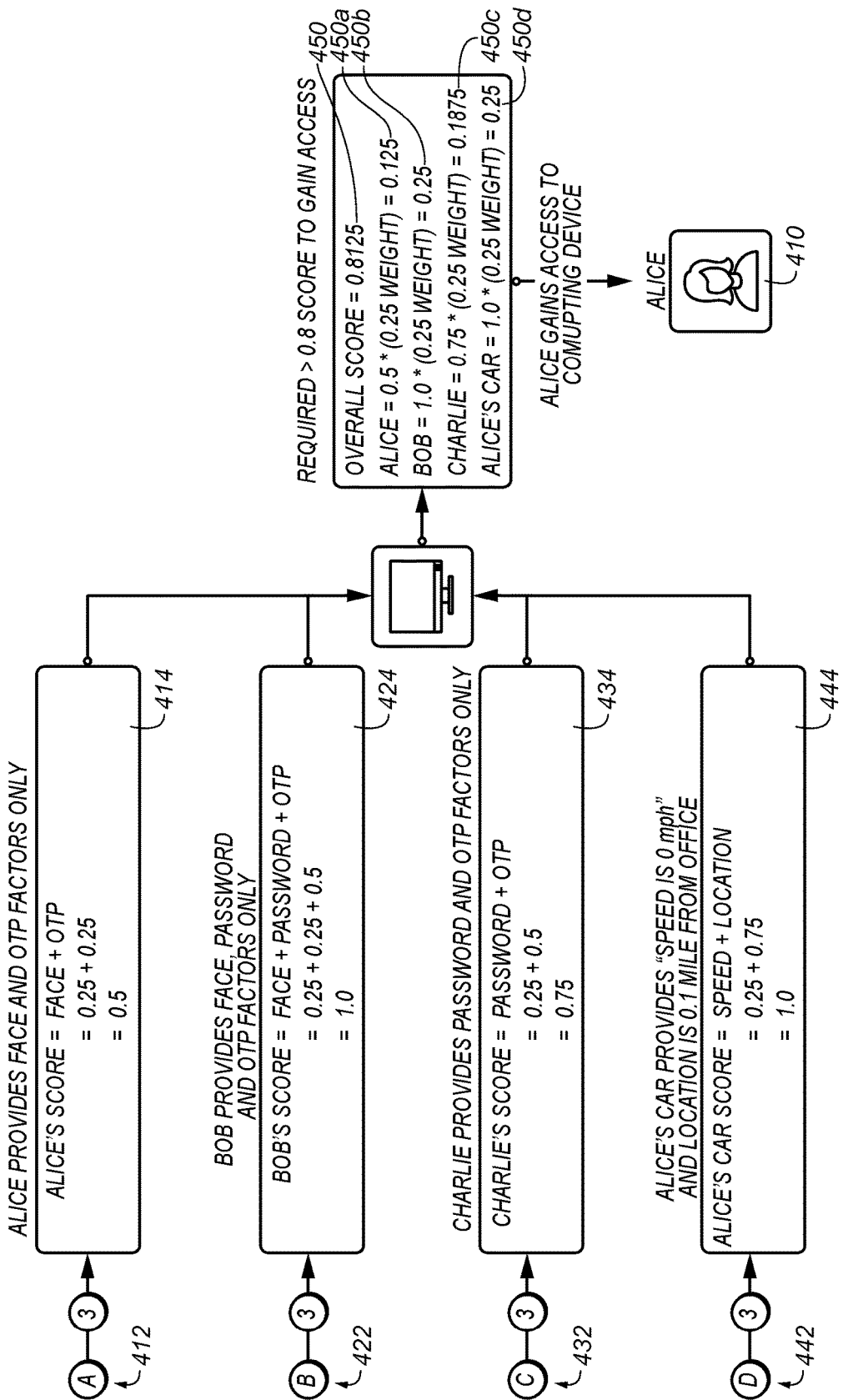

FIGS. 5A-5B illustrate an authentication scenario based upon the multiple factor and hierarchical registration model of FIGS. 4A-4B. As shown in this authentication scenario, the action requester, being Alice (AIS) 410, is required to obtain an overall authentication score of greater than 0.8. Computation of an overall authentication score factors not just the set of authentication factors 410, but further factors other sets of authentication factors 420, 430 and 440.

As shown, the action requester is able to satisfy (2) of the (4) directly associated authentication factors, being the face recognition 412b and the one time password (OTP) 412d authentication factors. The fingerprint 412a and password 412c are authentication factors that are not being satisfied in this authentication scenario. A value of the personal authentication factors that are satisfied within this scenario, sum to a value of (0.25+0.25=0.5), where the value 0.5 represents a (raw) authentication score for the set of authentication factors 410.

The first non-personal (non-traditional) authentication factor, being a human agent named Bob 420, otherwise known as Robert Douglas Anderson (RDA) 420, is able to satisfy (3) of the (3) authentication factors, being the face recognition 422a, password 422b and the one time password (OTP) 422c authentication factors. The value of these authentication factors that are satisfied within this scenario, sum to a value of (0.25+0.25+0.5=1.0), where the value 1.0 is the authentication score for the set of authentication factors 420.

The second non-personal (non-traditional) authentication factor, being the human agent named Charlie 430, otherwise known as Charles William Phillips (CWP) 430, is able to satisfy (2) of the (3) authentication factors, being the password 432a and the one time password (OTP) 432b authentication factors only. The value of these authentication factors 432 that are satisfied within this scenario, sum to a value of (0.25+0.5=0.75), where the value 0.75 is the authentication score for the set of authentication factors 430.

The third non-personal authentication factor which is based upon a GPS tracking device that is installed into the automobile (car) that is owned by the action requester AIS 110, was able to satisfy (2) of (2) associated authentication factors, being a measured speed of the car 442a and the location of the car 442b. The values of these authentication factors 442 that are satisfied within this scenario, sum to a value of (0.25+0.75=1.0), where the value 1.0 is the authentication score for the set of authentication factors 440.

The set of authentication factors 412 that are personally associated with the action requester AIS 410, sum to an authentication score value equal to 0.5, and have an overall weight equal to 0.25, and the set of authentication factors 412 contributes to the overall authentication score of the action requester 410 by a value equal to (0.5*0.25=0.125). Note that the overall weight of the set of authentication factors 412 is 0.25.

The set of authentication factors 422, which are associated with a human authentication factor other than the action requester, sum to a value equal to 1.0, and contributes to the overall authentication score of the action requester 410 by a value equal to (1.0*0.25=0.25). Note that the overall weight of the set of authentication factors 422 is 0.25.

The set of authentication factors 432, which are associated with a human authentication factor other than the action requester, sum to a value equal to 0.75, and contribute to the overall authentication score of the action requester 410 by a value equal to (0.75*0.25=0.1875). Note that the overall weight of the set of authentication factors 432 is 0.1875.

The set of authentication factors 442 that are directly associated with a human authentication factor other than the action requester, sum to a value equal to 1.0, and contributes to the overall authentication score of the action requester 410 by a value equal to (1.0*0.25=0.25).

The overall authentication score 450 of the action requester 410 is equal to a weighted sum of the raw authentication scores 414, 424, 434 and 444 that are each associated with the authentication factors 412, 422, 432 and 442 respectively.

The weighted authentication score 450a is that of the raw authentication scope 414. The weighted authentication score 450b is that of the raw authentication scope 424. The weighted authentication score 450c is that of the raw authentication scope 434. The weighted authentication score 450d is that of the raw authentication scope 444.

Hence, the overall authentication score 450 for the action requester 410 in this scenario, is equal to (0.125+0.25+0.1875+0.25=0.8125 which exceeds a minimum required authentication score value of 0.8, also referred to herein as a minimum authentication score. As a result, the requested action, being that of obtaining access to a computing system 120, is permitted and performed.

Note that within the above described use scenario, if hypothetically, Alice 410 satisfied all of her (4) personal authentication factors (412a-412d), being satisfaction of fingerprint 314a and face recognition 312b, satisfaction of the password 412c and satisfaction of the one-time password 412d, her contribution to the overall authentication score would be (1.0*0.25=0.25).

As a result, her 410 contribution to the overall authentication score, by itself, having a value of 0.25, would be a contribution of less than the minimum required authentication score value of 0.8, and as a result, the requested action from Alice 410, being that for obtaining access to a computer system 120, would be denied, absent any other authentication score contributions coming from other factors, such as from Charlie 430 and from Alice's car 440.

Also, if the contribution (satisfaction) of the authentication factors 422a-422c, 432a-432b and 442a-442b, that are not directly associated with Alice 410, are maximized, such a contribution(s) would amount to a value of 0.75, which by itself, would be less than the required value of 0.8, for access to the computer system 120 to be granted (permitted and performed).

In summary, this particular authentication scenario requires satisfaction of at least some of the authentication factors 422a-422c, 432a-432b and 442a-442b, that are not directly associated with Alice 410, in addition to requiring satisfaction of at least some of the authentication factors 412a-412d that are directly associated with Alice 410, for access to the computer system 120 to be granted.

In other words, satisfying all of the authentication factors 412a-412d that are directly associated with Alice 410 and satisfying none of the other authentication factors that are not directly associated with Alice 410, would not be sufficient for obtaining access to this particular computer system 120. Also, alternatively, satisfying none of the authentication factors 412a-412d that are directly associated with Alice 410, and satisfying all of the authentication factors 422a-422c, 432a-432b and 442a-442b that are not directly associated with Alice 410, would also not be sufficient for obtaining access to this particular computer system 120, within this particular authentication scenario.

Hypothetically, in a variation of the above described authentication criteria for this scenario, the authentication criteria could additionally require that with respect to the authentication factors that are directly associated with Alice 410, that at least one biometric authentication factor 412a-412b must be satisfied, as an additional condition for satisfying the overall authentication criteria, in order to grant (permit) access to the computer system 120.

Hypothetically, in another variation of the authentication criteria for this scenario, the authentication criteria could additionally require that with respect to the authentication factors that are directly associated with Alice 410, at least one non-biometric authentication factor 412c-412d must be satisfied, as an additional condition for satisfying the overall authentication criteria, either by itself, or in combination with at least one biometric authentication factor 412a-412b, collectively as one or more additional conditions for satisfying the overall authentication criteria, and to grant (permit) access to the computer system 120.

The additional conditions described above can also be applied to authentication factors 422a-422c, 432a-432b and 442a-442b, that are not directly associated with Alice 410. For example, hypothetically, the authentication factors associated with Bob 420 and Charlie 430, can be grouped into a combined group, where such a combined group has an overall weight equal to 0.5, so that if either Bob 420 or Charlie 430 provides full satisfaction for their respective authentication factors, then such evidence of authentication/authorization provides full satisfaction of the combined group of authentication factors associated with Bob 420 and Charlie 430, and contributes authentication contribution value equal to 0.5, that is added to the overall authentication score of Alice 410. The above description of the above conditions are just examples of how authentication criteria can be designed and defined to address and to minimize a risk of providing a false positive or false negative authentication result, with respect to authenticating a particular action requester.

Figure 6A:
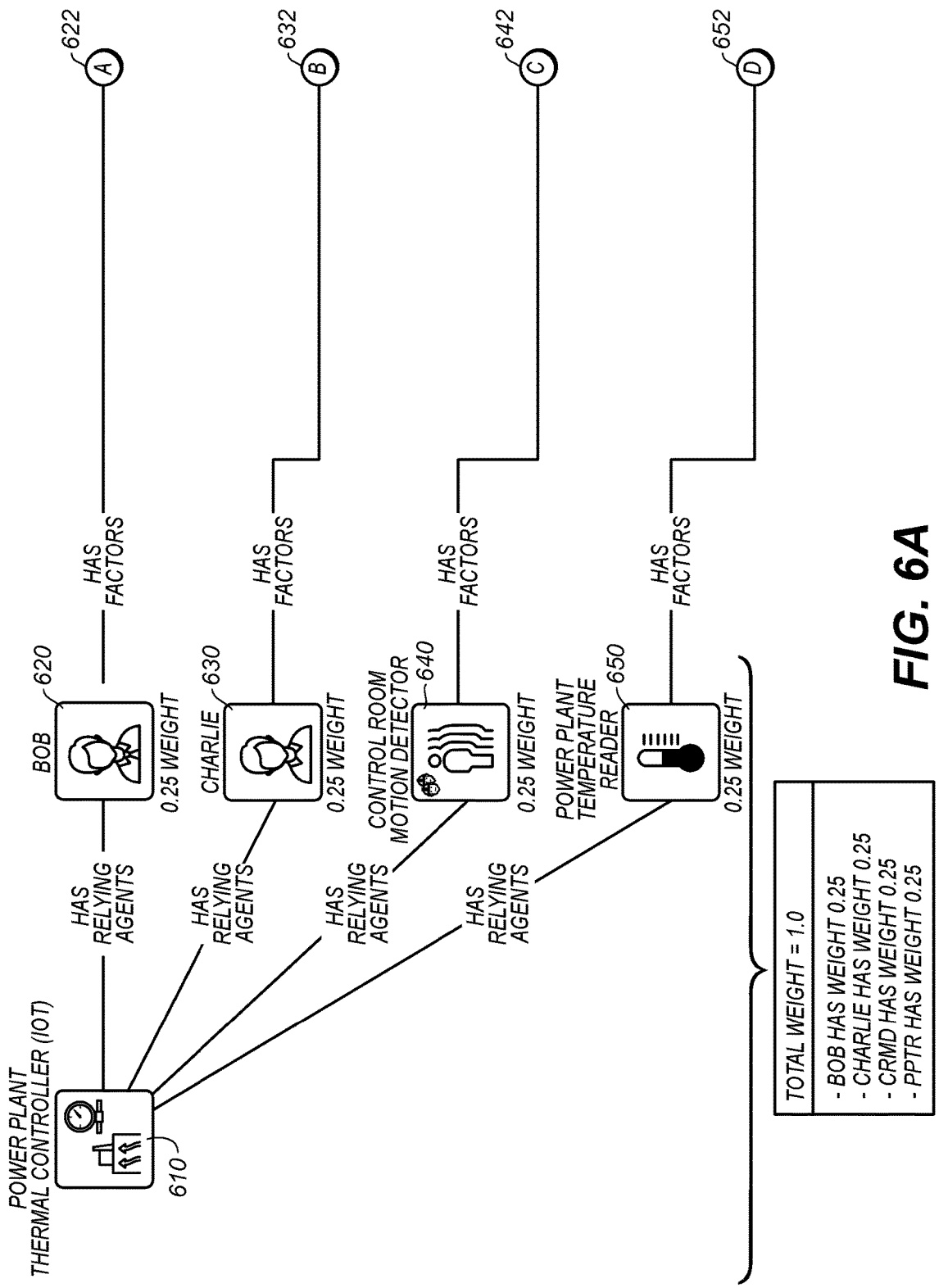
FIGS. 6A-6B illustrate a multiple factor and hierarchical registration model for a non-human action requester.
Figure 6B:
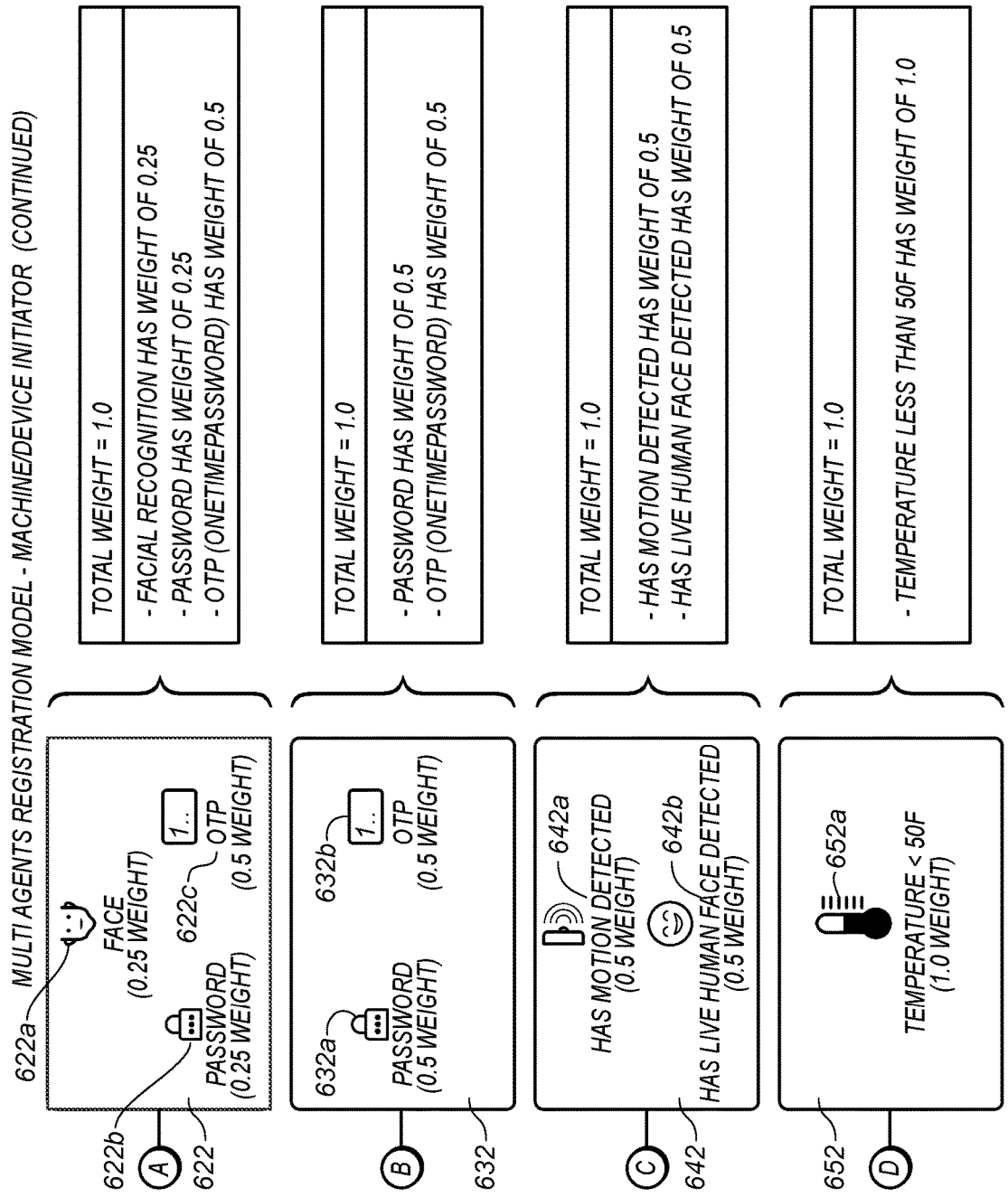

FIGS. 6A-6B illustrate a multiple factor and hierarchical registration model for a non-human action requester. This model is also referred to herein as an authentication validation graph.

As shown, there are (4) authentication factors that are directly associated with the action requester, being a power plant thermal controller 610. These (4) directly associated authentication factors include (2) human agents, being Bob 620 and Charlie 630, and (2) non-human agents, being a control room motion detector 640 and a power plant temperature reader 650. In this scenario, these agents 620, 630 and 640 are also referred to herein as authorizing agents, because much of the decision to permit or deny the requested action, involves considerations outside of authenticating the identity of the power plant thermal controller.

The first authentication factor, being a human agent named Bob 620, otherwise known as Robert Douglas Anderson (RDA) 620, has (3) associated personal authentication factors 622. These (3) personal factors are face recognition 622a, a password 622b and one time password (OTP) 622c, that are each assigned an authentication weight of 0.25, 0.25 and 0.5 respectively. The weights of these associated authentication factors summing to 1.0.

The second authentication factor being a human agent named Charlie 630, otherwise known as Charles William Phillips (CWP) 630, has (2) associated personal authentication factors 632. These (2) personal factors are a password 632a and one time password (OTP)632b, that are each assigned an authentication weight of 0.5 and 0.5 respectively. The weights of these associated authentication factors summing to 1.0.

The third authentication factor is dependent upon the operation of a control room face recognition and motion detector device 640. This third authentication factor has (2) associated sub-authentication factors, being motion detection device 642a and face recognition device 642b, that are each assigned an authentication weight of 0.5 and 0.5 respectively.

The fourth authentication factor is dependent upon the operation of a power plant temperature reader device 650. This fourth authentication factor has an associated sub-authentication factor 652, being criteria determining whether a measured temperature value is less than 50 degrees Fahrenheit, and is assigned an authentication weight of 1.0.

Figure 7A:
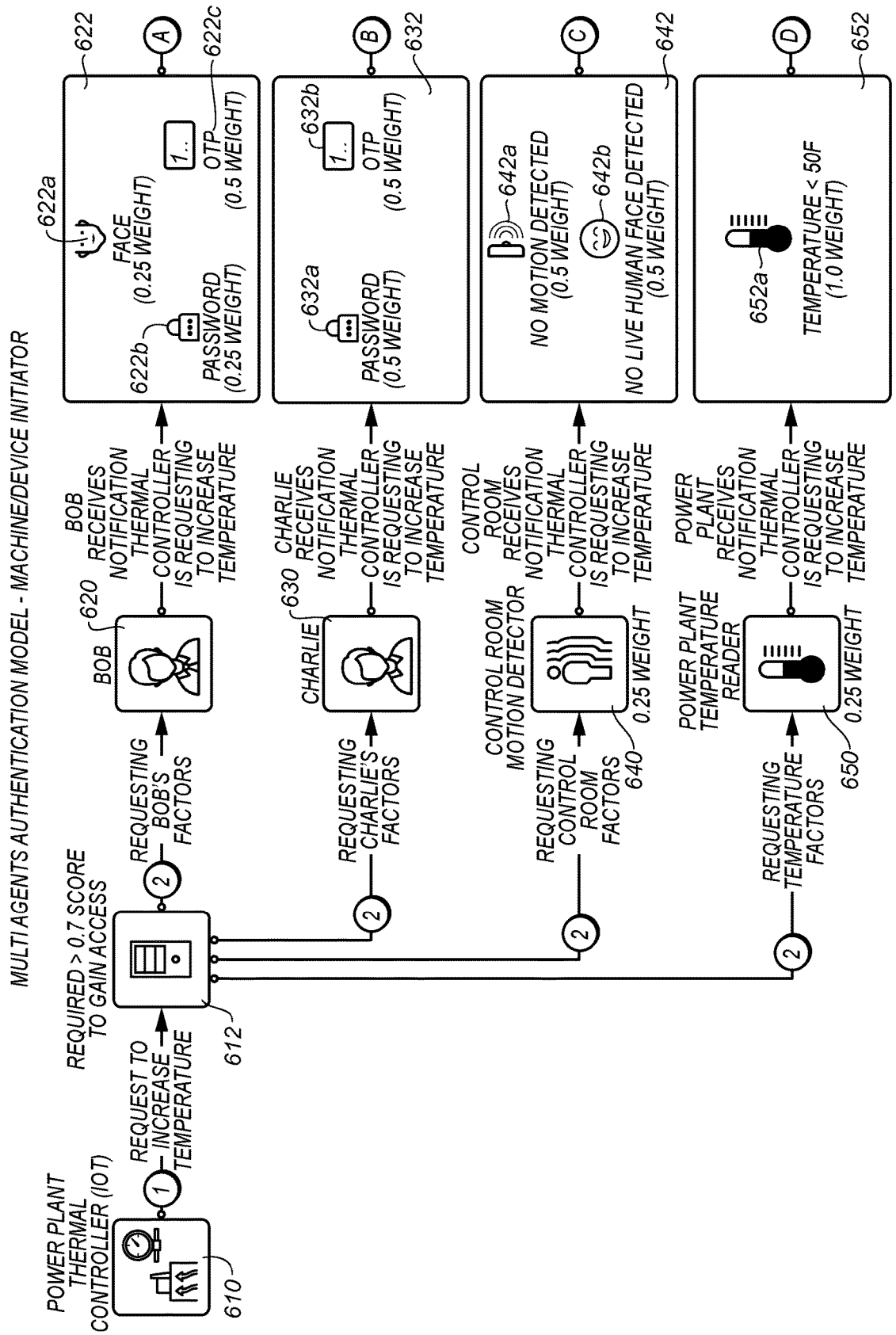
FIGS. 7A-7B illustrate an authentication scenario based upon the multiple factor and hierarchical registration model of FIG. 6.
Figure 7B:
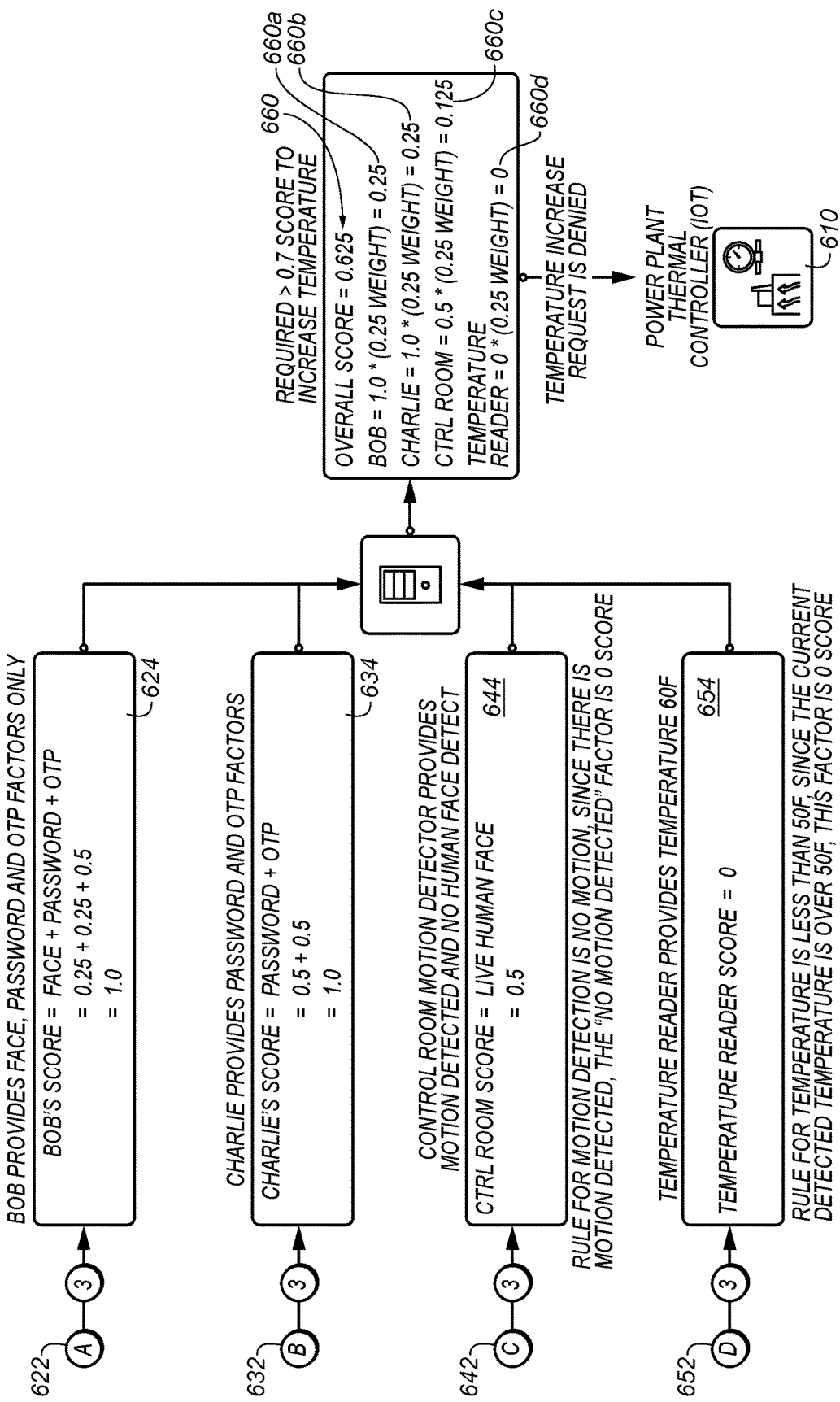

FIGS. 7A-7B illustrate an authentication scenario based upon the multiple factor and hierarchical registration model of FIG. 6. As shown in this authentication scenario, the non-human action requester, being a power plant thermal controller 610, is required to obtain an overall authentication score of greater than 0.7.

The first authentication factor, being a human agent named Bob 620, otherwise known as Robert Douglas Anderson (RDA) 620, is able to satisfy (3) of the (3) authentication factors, being the face recognition 622a, a password 622b and a one-time password (OTP) 622c authentication factors. The values of these direct authentication factors are satisfied within this particular scenario, sum to a contribution value of (0.25+0.25+0.5=1.0).

The second authentication factor, being the human agent named Charlie, otherwise known as Charles William Phillips (CWP) 630, is able to satisfy (2) of the (2) authentication factors, being a password 632a and a one-time password (OTP)632b authentication factors. The values of these indirect authentication factors 632 that are satisfied within this particular scenario, sum to a contribution value of (0.5+0.5=1.0).

The third authentication factor 640 is dependent upon the operation of a control room motion detector and face recognition device. This third authentication factor has (2) associated sub-authentication factors, being motion detection 642a and face recognition 642b, that are each assigned an authentication weight of 0.5 and 0.5 respectively. Exercise of these sub-authentication factors satisfies (1) of the (2) authentication factors, in circumstances where the motion detection authentication sub-factor 642a is satisfied only. The values of these sub-authentication factors that are satisfied within this particular scenario, sum to a contribution value of (0.5+0.0=0.5).

The fourth authentication factor is dependent upon the operation of a power plant temperature reader device. This fourth authentication factor has an associated sub-authentication factor, being criteria determining whether a measured temperature value is less than 50 degrees Fahrenheit, and is assigned an authentication weight of 1.0. In this particular scenario, exercise of this sub-authentication factor is not satisfied, where the measured temperature is 60 degrees Fahrenheit, which is not a value less than 50 degrees Fahrenheit. The contribution value of this sub-authentication factor sum to a value of 0.0.

The sum of the contribution values of the above (4) authentication factors, is equal to (0.25+0.25+0.125+0.=0.625), which is less than a minimum required authentication score value of 0.7. As a result, the requested action, being that of increasing the operating temperature of the power plant, is not granted and denied.

In some other embodiments, human authentication factors are conditionally invoked if other authentication factors, such as for example, authentication factors that are more personal to the action requester, fail to achieve a sufficient authentication score.

For example, in some other embodiments, if an action requester communicates a correct password, but fails to provide a matching biometric feature, such as failing to provide a fingerprint that matches a registered fingerprint associated with an identifying factor of the action requester, and/or failing to provide a required security token, then one or more human agents are contacted by the system of the invention to authenticate and/or to authorize performance of the action that is being requested by the action requester.

However, in some other embodiments, if an action requester, such as for example Alice 410, satisfies all of the authentication factors 412a-412d, then this triggers a condition where satisfaction of authentication factors 420, 430 and 440 are not required to be exercised for her 410 to obtain requested access.

This written description uses example embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for authenticating and authorizing performance of an action, the system comprising:
   a computer terminal comprising an action request interface component that is configured for receiving an action request from an action requester, said action request being a request for the action to be permitted, and for receiving a first set of authentication information from said action requester via the computer terminal, said first set of authentication information comprising one or more traditional authentication factors that are personal to said action requester; and
   a first communications channel formed in a communications network between said access request interface component and a computer system for providing communication between said access request interface component and the computer system, the computer system comprising a database storing authentication registration information and physical memory storing an authorizing logic component;
   wherein said authorizing logic component is configured to determine a set of one or more authorizing actions that are required in association with an identity of said action requester and with said action request, said one or more authorizing actions comprising processing the one or more traditional authentication factors and one or more non-traditional authentication factors that are not personal to said action requester;
   wherein the one or more traditional authentication factors comprise one or more of a password known to the action requester, a biometric feature of the action requester, and an object in the possession of the action requester;
   wherein the one or more non-traditional authentication factors comprise one or more of a GPS location of a GPS tracking device and authorization from a human authorizing agent through a portable communications device of the authorizing agent that is in operable communication with the computer system;
   wherein said authorizing logic component includes an authorization formula that produces an authorization score based on the processing of the one or more traditional authentication factors and one or more non-traditional authentication factors that are not personal to said action requester; and
   wherein said authorizing logic component includes a minimum authorization score required to permit said action, the minimum authorization score determined such that in order for the authorization score to meet the minimum authorization score, both satisfaction of at least one traditional authentication factor and satisfaction of at least one non-traditional authentication factor are required.

2. The system of claim 1 wherein processing the one or more non-traditional authentication factors comprises communication with one or more authorizing agents.

3. The system of claim 2 wherein at least one authorizing agent is a network accessible device.

4. The system of claim 1 wherein the action requester is not a human being.

5. The system of claim 1 wherein said first set of authentication information includes a representation of a biometric feature of said action requester.

6. An apparatus for authenticating and authorizing performance of an action, the apparatus comprising:
   a computer terminal comprising an action request interface component that is configured for receiving an action request from an action requester, said action request being a request for the action to be permitted, and for receiving a first set of authentication information from said action requester via the computer terminal, said first set of authentication information comprising one or more traditional authentication factors that are personal to said action requester; and
   a first communications channel formed in a communications network between said access request interface component and a computer system for providing communication between said access request interface component and the computer system, the computer system comprising a database storing authentication registration information and physical memory storing an authorizing logic component;
   wherein said authorizing logic component is configured to determine a set of one or more authorizing actions that are required in association with an identity of said action requester and with said action request, said one or more authorizing actions comprising processing the one or more traditional authentication factors and one or more non-traditional authentication factors that are not personal to said action requester;
   wherein said one or more traditional authentication factors comprise one or more of a password known to the action requester, a biometric feature of the action requester, and an object in the possession of the action requester;
   wherein said one or more non-traditional authentication factors comprise one or more of a GPS location of a GPS tracking device and authorization from a human authorizing agent through a portable communications device of the authorizing agent that is in operable communication with the computer system; and
   wherein in order for the authorizing logic component to permit said action, both satisfaction of at least one traditional authentication factor and satisfaction of at least one non-traditional authentication factor are required.

7. The apparatus of claim 6 wherein said one or more non-traditional authentication factors comprise communication with an authorizing agent that is a network accessible device.

8. The apparatus of claim 6 wherein the action requester is not a human being.

9. The apparatus of claim 6 wherein said first set of authentication information includes a representation of a biometric feature of said action requester.

10. A method for authenticating and authorizing performance of an action, the method comprising:
    receiving, at an action request interface component, an action request and a first set of authentication information from an action requester, said action request being a request for the action to be permitted, and said first set of authentication information comprising one or more traditional authentication factors that are personal to said action requester;
    communicating between said access request interface component and an authorizing logic component;
    using said authorizing logic component to determine a set of one or more authorizing actions that are required in association with an identity of said action requester and with said action request, said one or more authorizing actions comprising processing the one or more traditional authentication factors and one or more non-traditional authentication factors that are not personal to said action requester;

performing said one or more authorizing actions and computing an authorization score based on processing of the one or more traditional authentication factors and one or more non-traditional authentication factors that are not personal to said action requester; and permitting said action when the authorization score meets a minimum authorization score required to permit said action, the minimum authorization score determined such that in order for the authorization score to meet the minimum authorization score, both satisfaction of at least one traditional authentication factor and satisfaction of at least one non-traditional authentication factor are required;

wherein the one or more traditional authentication factors comprise one or more of a password known to the action requester, a biometric feature of the action requester, and an object in the possession of the action requester; and wherein the one or more non-traditional authentication factors comprise one or more of a GPS location of a GPS tracking device and authorization from a human authorizing agent through a portable communications device of the authorizing agent that is in operable communication with the computer system.

11. The method of claim 10 wherein processing the one or more non-traditional authentication factors comprises communication with one or more authorizing agents.

12. The method of claim 11 wherein at least one authorizing agent is a network accessible device.

13. The method of claim 11 wherein at least one authorizing agent is a human being.

14. The method of claim 10 wherein the action requester is not a human being.

15. The method of claim 10 wherein said first set of authentication information includes a representation of a biometric feature of said action requester.

* * * * *